(12) United States Patent
Pinson et al.

(10) Patent No.: US 10,941,904 B1
(45) Date of Patent: Mar. 9, 2021

(54) HP GAS SUPPLY SYSTEM AND METHOD

(71) Applicant: Wright Brothers Global Gas, LLC, Montgomery, OH (US)

(72) Inventors: Michael F Pinson, Cincinnati, OH (US); Charles Cummings Wright, Cincinnati, OH (US)

(73) Assignee: WRIGHT BROTHERS GLOBAL GAS, LLC, Montgomery, OH (US)

( * ) Notice: Subject to any disclaimer, the term of this patent is extended or adjusted under 35 U.S.C. 154(b) by 0 days.

(21) Appl. No.: 16/808,644

(22) Filed: Mar. 4, 2020

(51) Int. Cl.
*G05D 11/00* (2006.01)
*F17C 7/00* (2006.01)

(52) U.S. Cl.
CPC ........ *F17C 7/00* (2013.01); *F17C 2201/0104* (2013.01); *F17C 2205/0142* (2013.01); *F17C 2205/0146* (2013.01); *F17C 2205/0335* (2013.01); *F17C 2205/0338* (2013.01); *F17C 2223/035* (2013.01); *F17C 2225/033* (2013.01); *F17C 2250/043* (2013.01); *F17C 2250/077* (2013.01); *Y10T 137/2569* (2015.04)

(58) Field of Classification Search
CPC ......... Y10T 137/2569; Y10T 137/2572; F17C 2205/0142; F17C 2205/0146; F17C 2205/0335
See application file for complete search history.

(56) References Cited

U.S. PATENT DOCUMENTS

| | | | | |
|---|---|---|---|---|
| 1,841,325 A | * | 1/1932 | Deming | F17C 7/00 222/3 |
| 2,168,701 A | * | 8/1939 | Buttner | F17C 13/045 222/6 |
| 2,257,249 A | * | 9/1941 | Thomas | F17C 13/045 222/6 |
| 2,547,823 A | * | 4/1951 | Josephian | B67D 1/1252 137/113 |
| 2,768,640 A | * | 10/1956 | Zimmer | G05D 16/2093 137/113 |
| 2,968,162 A | * | 1/1961 | Acomb | F17C 13/045 62/48.1 |

(Continued)

OTHER PUBLICATIONS

Harris Specialty Gas, "Project: Model 900BR-1R36-1L36-580", Jan. 3, 2019, The Harris Product Group (1 page).

(Continued)

*Primary Examiner* — Robert K Arundale
(74) *Attorney, Agent, or Firm* — Daniel F. Nesbitt; Hasse & Nesbitt LLC (57) ABSTRACT

A gas supply system for providing high pressure (HP) gas to a low pressure (LP) gas destination, having a primary HP gas unit and a reserve HP gas unit, which provide regulated lower-pressure gas to a supply manifold, and an LP destination regulator that provides an LP regulated gas supply to a consumption subsystem. A one-way flow valve in fluid communication from the primary HP gas unit to the reserve HP gas unit, ensures that the reserve HP gas unit remains substantially full, even after numerous cycles of depletion and replacement of the primary HP gas unit, during which the HP supply is provided by the reserve HP gas unit, which helps to avoid the risk that the reserve tank pressure and supply might mistakenly, unexpectedly or unintentionally be depleted.

7 Claims, 4 Drawing Sheets

(56) References Cited

U.S. PATENT DOCUMENTS

| | | | | |
|---|---|---|---|---|
| 3,643,677 | A | * | 2/1972 | Begleiter .............. F17C 13/045 |
| | | | | 137/113 |
| 4,944,324 | A | * | 7/1990 | Kajino .................. F17C 13/045 |
| | | | | 137/113 |
| 6,105,598 | A | * | 8/2000 | Cabrera .................. F17C 13/04 |
| | | | | 137/113 |
| 6,260,568 | B1 | * | 7/2001 | Hsu ....................... F17C 13/045 |
| | | | | 137/113 |
| 7,000,629 | B1 | * | 2/2006 | Lucas, Jr. .............. F17C 13/045 |
| | | | | 137/113 |
| 2004/0118476 | A1 | * | 6/2004 | Borck ....................... F17C 5/06 |
| | | | | 141/4 |
| 2006/0151027 | A1 | * | 7/2006 | Pearson ................ F17C 13/045 |
| | | | | 137/113 |
| 2011/0232780 | A1 | * | 9/2011 | Arnott ................ G05D 16/0666 |
| | | | | 137/505 |

OTHER PUBLICATIONS

Vendor Managed Gas, "Auto-Refill Auto Switch-over Manifold", Oct. 24, 2019, VMG (1 page).

Harris Specialty Gas Equipment, "Project: Model 900BR-1R36-1L36-580", dated Jan. 3, 2020 (unpublished), Revision 01, Revised Jul. 6, 2020 (1 page).

\* cited by examiner

HP GAS SUPPLY SYSTEM AND METHOD

BACKGROUND OF THE INVENTION

Conventional gas supply system to supply and regulate a high pressure (HP) gas to a low pressure (LP) gas for supplying a usage gas consumption system, such as medical and industrial instrumentation. Such typical gases including both elemental and compound gases, including nitrogen, oxygen, carbon dioxide, argon, hydrogen, helium and acetylene. The HP gas supply system provides a HP gas supply through one or more primary HP gas supply cylinders, typically at high pressure gas pressures up to and greater than 1,000 pounds per square inch gauge (psig), and supply a usage gas at much lower pressures through a series of gas pressure regulators, including a primary regulator that typically regulates the high pressure gas down to a LP supply gas stream. In one example, the primary regulator regulates the high pressure gas down to a supply manifold as a LP supply gas at a primary regulated pressure of about 125 psig, and a second low-pressure (LP) supply regulator regulates the LP supply gas down to a usage gas stream at a usage regulated pressure of about 100 psig. In such system, when the pressure and therefore supply of HP gas in the primary cylinder becomes used-up or depleted, the supply of a stream of usage gas to the usage gas consumption system also ended.

To provide some level protection or warning that the primary HP gas supply had become depleted, a reserve HP gas system was installed in parallel with the primary HP gas system, which also supplied a LP gas stream to the supply manifold through a separate reserve HP regulator that typically regulates the high pressure gas down to a LP supply gas stream at a reserve regulated pressure $P_2$ that is configured to be lower than the primary regulated pressure $P_1$, typically by about 5 psig. In this configuration, after the supply pressure of the primary cylinder 10 drops to the reserve regulated pressure $P_2$, the high-pressure gas supply is assumed (replaced) by the reserve cylinder. The HP gas supply will continue to be drawn from the reserve cylinder until the depleted primary cylinder is removed from the primary HP gas system, and replaced with a full, replacement primary cylinder. Once the replacement primary cylinder is connected and the HP gas flows into the primary HP gas system, the flow of LP gas to the low-pressure (LP) supply regulator is restored exclusively from the primary HP gas unit at the primary regulated pressure of 125 psig ($P_1$). The reserve cylinder and the reserve HP gas unit, however, is not replaced or replenished, or at least rarely replaced. In time, through a series of uses and depletions of the primary HP gas unit, the gas pressure and thus the supply of reserve gas in the reserve HP gas unit and reserve cylinder can become low, which can risk a situation where even the reserve system may become depleted soon after a primary cylinder has been depleted.

Despite the protection that the reserve HP gas unit provides to maintain a steady operation of the HP gas supply system, there remains a risk that the present system inherently presents a risk that the gas pressure and gas supply in the reserve HP gas unit (reserve cylinder) may mistakenly, unexpectedly, or unintentionally, be depleted, risking the continuous and necessary supply of LP gas to the usage gas consumption system.

SUMMARY OF THE INVENTION

The present invention provides a gas supply system for providing high pressure (HP) gas to a low pressure (LP) gas destination, having a primary HP gas unit and a reserve HP gas unit, which provide regulated lower-pressure gas to a supply manifold, and an LP destination regulator that provides an LP regulated gas supply to a usage gas consumption system. A one-way flow valve in fluid communication from the primary HP gas unit to the reserve HP gas unit, ensures that the reserve HP gas unit remains substantially full, even after numerous cycles of depletion and replacement of the primary HP gas unit, during which the HP supply is provided by the reserve HP gas unit.

The present invention provides a system for providing high pressure (HP) gas to a low pressure (LP) gas destination, comprising a primary HP gas unit, a reserve HP gas unit, a supply manifold, an LP destination regulator, and a one-way flow valve in fluid communication from the primary HP gas unit to the reserve HP gas unit.

The primary HP gas unit comprises one or more primary cylinders containing HP gas, each primary cylinder including an outlet shutoff valve, a primary HP regulator having a gas inlet and a regulated gas outlet, the primary HP regulator configured to regulate the primary HP gas released from the one or more primary cylinders to a primary low pressure (LP) supply gas at a primary regulated pressure $P_1$, and a primary HP manifold connected in fluid communication between the outlet of the shutoff valve of each one or more primary cylinders and the gas inlet of the primary HP regulator.

The reserve HP gas unit comprises one or more reserve cylinders containing HP gas, each reserve cylinder including an outlet shutoff valve, a reserve HP regulator having a gas inlet and a regulated gas outlet, the reserve HP regulator configured to regulate the reserve HP gas released from the one or more reserve cylinders to a reserve LP supply gas at a reserve regulated pressure $P_2$ that is less than the primary regulated pressure $P_1$, and a reserve HP manifold connected in fluid communication between the outlet of the shutoff valve of each one or more reserve cylinders, and the gas inlet of the reserve HP regulator.

The supply manifold connects in fluid communication to the regulated gas outlet of the primary HP regulator, and the regulated gas outlet of the reserve HP regulator.

The LP destination regulator has a gas inlet in fluid communication with the supply manifold, and a regulated gas outlet in fluid communication with a usage gas consumption system, the LP supply regulator configured to regulate the primary LP supply gas or the reserve LP supply gas at a usage pressure $P_3$ that is less than primary regulated pressure $P_1$ and reserve regulated pressure $P_2$.

The one-way flow valve has an inlet in fluid communication with the primary HP manifold, and an outlet in fluid communication with the reserve HP manifold. In an embodiment of the invention, the one-way flow valve is a check valve.

The present invention provides a HP gas supply system, comprising one or more primary cylinders, a primary HP manifold, one or more reserve cylinders, a reserve HP manifold, and a one-way flow valve. The one or more primary cylinders contain an HP gas and include an outlet shutoff valve. The primary HP manifold connects in fluid communication to the outlet shutoff valve of each one or more primary cylinders, and to a separate, low-pressure gas consumption subsystem. The one or more reserve cylinders contain an HP gas and include an outlet shutoff valve. The reserve HP manifold connects in fluid communication to the outlet shutoff valve of each one or more reserve cylinders, and to the low-pressure gas consumption subsystem. The one-way flow valve has an inlet in fluid communication with the primary HP manifold, and an outlet in fluid communication with the reserve HP manifold. In an embodiment, the one-way flow valve is a check valve.

The separate low-pressure gas consumption subsystem comprises a primary pressure regulator, a reserve pressure regulator, a supply manifold, and an LP destination regulator, for regulating and supplying a usage gas stream to a usage gas consumption system.

The primary pressure regulator has a gas inlet in fluid communication with the primary HP manifold, and a regulated gas outlet, and is configured to regulate the primary outlet gas released from the one or more primary cylinders at a primary regulated pressure $P_1$.

The reserve pressure regulator has a gas inlet in fluid communication with the reserve HP manifold, and a regulated gas outlet, and is configured to regulate the reserve outlet gas released from the one or more reserve cylinders at a reserve regulated pressure $P_2$ that is less than primary regulated pressure $P_1$.

The supply manifold connects in fluid communication to the regulated gas outlet of the primary HP regulator, the regulated gas outlet of the reserve HP regulator. The LP destination regulator has a gas inlet in fluid communication with the supply manifold, and a regulated gas outlet in fluid communication with a separate LP gas destination, and is configured to regulate the primary outlet gas or the reserve outlet gas at a usage pressure $P_3$ that is less than the primary regulated pressure $P_1$ and the reserve regulated pressure $P_2$.

The present invention also provides a method for providing high pressure (HP) gas to a low pressure (LP) gas destination using a primary HP gas supply source and a reserve HP gas supply source, comprising the steps of: supplying a primary HP gas at a primary high pressure PH; pressure regulating the primary HP gas to a supply gas stream at a primary regulated pressure $P_1$; supplying a reserve HP gas at a reserve HP pressure PR; pressure regulating the reserve HP gas to the supply gas stream at a reserve regulated pressure $P_2$ that is less than the primary regulated pressure $P_1$; further pressure regulating the supply gas stream to a low pressure (LP) usage stream at a regulated usage pressure $P_3$ that is less than $P_1$ and $P_2$; providing a one-direction flow means that only allows a flow of gas from the primary HP gas to the reserve HP gas; and passing an amount of the primary HP gas through the one-direction flow means to the reserve HP gas when the primary high pressure PH is greater than the reserve HP pressure PR.

The present invention further provides a method for providing high pressure (HP) gas to a low pressure (LP) gas destination using a primary HP gas supply source and a reserve HP gas supply source. The method comprises the steps of: supplying a primary HP gas stream at a primary high pressure PH from the primary HP gas supply source, and pressure regulating the primary HP gas stream to a supply gas stream at a primary regulated pressure $P_1$; supplying a reserve HP gas stream at a reserve HP pressure PR from the reserve HP gas supply source, and pressure regulating the reserve HP gas stream to the supply gas stream at a reserve regulated pressure $P_2$ that is less than the primary regulated pressure $P_1$; further regulating the supply gas stream to a low pressure (LP) usage stream at a regulated usage pressure $P_3$ that is less than $P_1$ and $P_2$; wherein when the primary high pressure PH falls to the primary regulated pressure $P_1$, the primary HP gas supply source is substantially depleted, and both the primary HP gas stream and the reserve HP gas stream are supplied to the supply gas stream that is regulated to the LP usage stream at the regulated usage pressure $P_3$, and when primary high pressure PH falls to the reserve regulated pressure $P_2$, the primary HP gas supply source is depleted, and only the reserve HP gas stream is supplied to the supply gas stream that is regulated to the LP usage stream at the regulated usage pressure $P_3$; providing a one-direction flow means that only allows a flow of gas from a primary HP gas supply source to a reserve HP gas supply source; replacing the substantially depleted or depleted HP gas supply source with a replacement primary HP gas supply source, and resupplying a primary HP gas stream at a replacement primary high pressure PH; and passing an amount of the primary HP gas stream from the replacement primary HP gas supply source through the one-direction flow means to the reserve HP gas supply source, until the gas pressure of the gas within the placement primary HP gas supply source and the gas within the reserve HP gas supply source equilibrate. In an embodiment of the invention, the one-direction flow means is a check valve.

The present invention is useful in high pressure gas supply systems for a wide variety of gases, or any gas or mixture of gases including compressed air, a gas being either an elemental or compound gas, including any one of nitrogen, oxygen, carbon dioxide, argon, hydrogen, helium, and acetylene.

Typical examples of one-direction or one-way flow valves include ball, spring, swing, poppet, and piston check valves. The materials of construction are typically a stainless steel, for example, 316 stainless steel, brass, bronze, and other metals or alloys, and elastomeric materials and composites may be used.

DETAILED DESCRIPTION OF THE INVENTION

Figure 1:
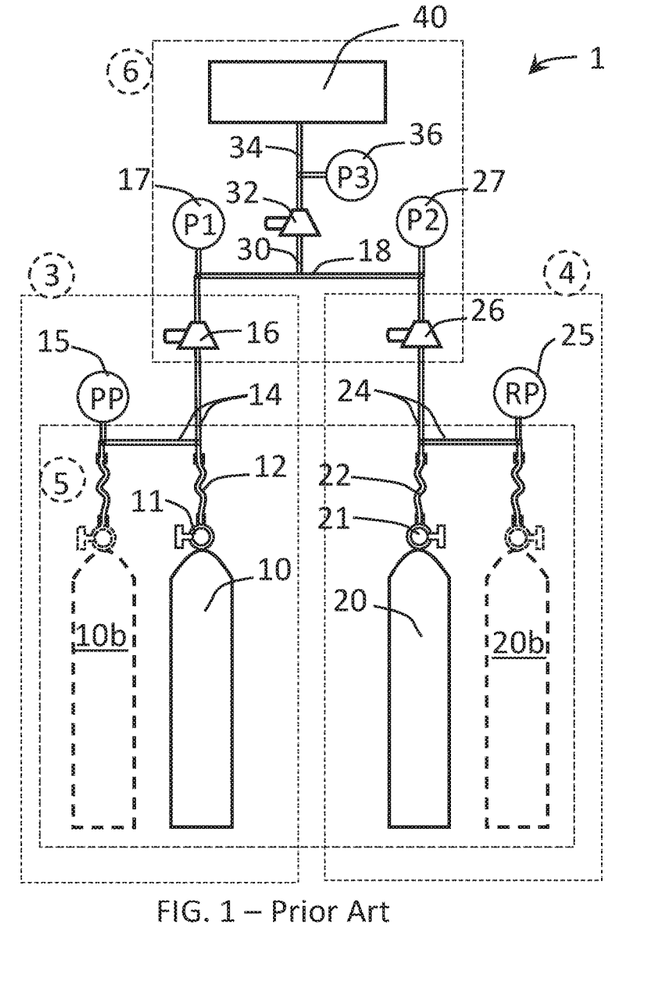
FIG. 1 shows a conventional gas supply system to supply and regulate a high pressure (HP) gas to a low pressure (LP) gas to a low-pressure gas consumption system, the HP gas supply having a primary HP gas unit and a reserve HP gas unit.

FIG. 1 shows a conventional gas supply system 1 to supply and regulate a high pressure (HP) gas to a separate, usage gas consumption system 40. The HP gas supply includes a primary HP gas unit 3 and a reserve HP gas unit 4, that supply and regulate the HP gas streams as low-pressure (LP) gas streams to a LP gas stream, which is then further regulated by an LP gas subsystem 6 to supply LP gas at a usage pressure for consumption by a separate usage gas consumption system 40. As described in more detail below, the gas supply system is configured to provides a high pressure (HP) gas supply through one or more primary HP gas supply cylinders 10, typically at high pressure gas pressures up to and greater than 1,000 pounds per square inch gauge (psig), to supply a usage gas for a usage gas consumption system 40 through a series of gas pressure regulators, including a primary HP regulator 16 that typically regulates the high pressure gas down to a supply manifold 18 as a LP supply gas stream at a primary regulated pressure $P_1$ of about 125 psig that flows, and a second low-pressure (LP) supply regulator 32 that typically regulates the LP supply gas down to a usage gas stream at a usage regulated pressure $P_3$ of about 100 psig. In such system in the past, when the pressure and therefore supply of HP gas in the primary cylinder 10 became used-up or depleted, the supply of a stream of usage gas to the usage gas consumption system 40 also ended.

To provide some level protection or warning that the primary HP gas supply had become depleted, a reserve HP gas system was installed in parallel with the primary HP gas system, which also supplied a LP gas stream to the supply manifold 18 through a separate reserve HP regulator 26 that typically regulates the high pressure gas down to a LP supply gas stream at a reserve regulated pressure $P_2$ that is configured to be lower than the primary regulated pressure $P_1$, typically by about 5 psig. In this configuration, after the supply pressure of the primary cylinder 10 drops to the reserve regulated pressure $P_2$, the high-pressure gas supply is assumed by (replaced by) the reserve cylinder 20. The HP gas supply will continue to be drawn from the reserve cylinder 20 until the depleted primary cylinder 10 is removed from the primary HP gas system 3, and replaced with a full, replacement primary cylinder 10. Once the replacement primary cylinder 10 is connected and the HP gas flows into the primary HP gas system 3, the flow of LP gas to the low-pressure (LP) supply regulator 32 is restored exclusively from the primary HP gas unit 3 at the primary regulated pressure of 125 psig ($P_1$). The reserve cylinder 20 and the reserve HP gas unit 4, however, is not replaced or replenished. In time, through a series of uses and depletions of the primary HP gas unit 3, the gas pressure and thus the supply of reserve gas in the reserve HP gas unit 4 and reserve cylinder 20 can be low, which can risk a situation where even the reserve system may become depleted soon after a primary cylinder 10 has been depleted.

Figure 2:
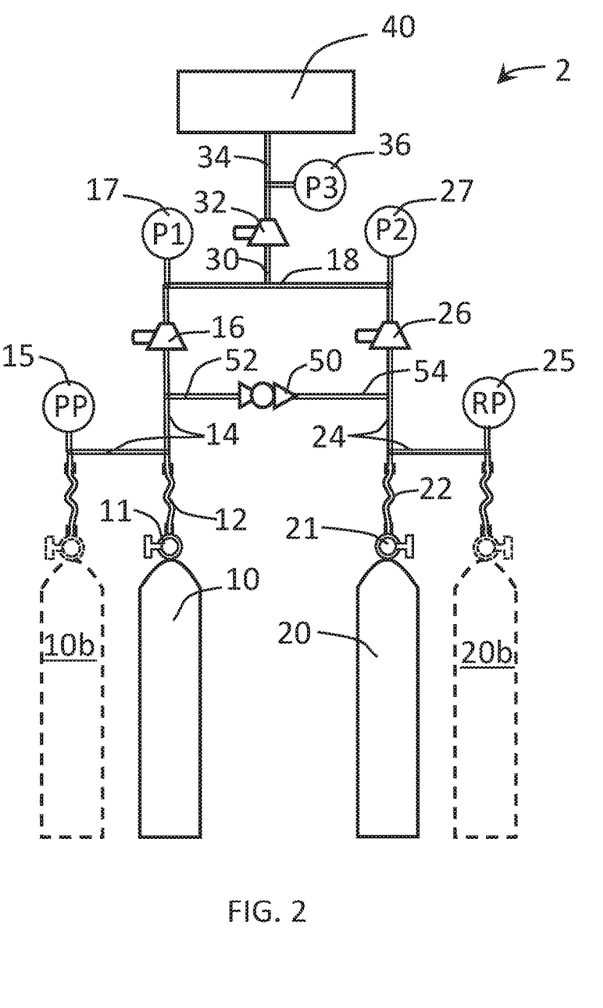
FIG. 2 shows a gas supply system of the present invention, in which the gas supply system further includes a one-way flow valve to provide fluid communication from the primary HP gas unit to the reserve HP gas unit.

FIG. 2 shows a gas supply system 2 of the present invention, which provides an improvement to the conventional gas supply system to supply and regulate a high pressure (HP) gas to a separate, usage gas consumption system 40. The improvement is provided by a one-way gas flow means between the primary HP gas unit 3 and the reserve HP gas unit 4, that includes a one-way flow valve 50 having an inlet line 52 in fluid communication with the primary HP manifold 14, and an outlet line 54 in fluid communication with the reserve HP manifold 24. As described herein, the one-way gas flow means provides a flow of a portion of the fresh HP gas from the replacement primary cylinder 10, into the reserve cylinder 20, each time the primary cylinder is replaced. The HP gas flow is one-way only, from the replaced primary cylinder 10 at a full or fresh gas pressure, $P_P$, to the reserve cylinder 20 which is almost always at a gas pressure, PR, that is less than $P_P$.

The primary HP gas unit 3 includes one or more primary cylinders (also known as tanks) 10, 10b containing HP gas, a primary HP manifold 14 connected in fluid communication to each one or more primary cylinders 10, and a primary HP regulator 16 having a gas inlet in fluid (gas) communication with the primary HP manifold 14, and a gas outlet, and regulates the primary outlet gas released from the one or more primary cylinders 10 at a primary regulated pressure $P_1$.

The reserve HP gas unit 4 includes one or more reserve cylinders 20, 20b containing HP gas, a reserve HP manifold 24 connected in fluid communication to each one or more reserve cylinders 20, and a reserve HP regulator 26 having a gas inlet in fluid (gas) communication with the reserve HP manifold 24, and a gas outlet, to regulate the reserve outlet gas released from the one or more reserve cylinders 20 at a reserve regulated pressure $P_2$.

The gas contained within either the primary cylinder 10 or the reserve cylinder 20 is typically supplied when full at a high pressure, designed PH, of typically at least 1000 pounds per square inch gauge (psig), and within the range from 1500 to 3500 psig.

A typical usage gas consumption system 40 may be supplied with a low-pressure usage gas stream at a usage pressure designated $P_3$, typically a pressure of about 100 psig, or lower, with the LP gas being separately regulated by pressure regulators within the usage gas consumption system 40. In an embodiment of the invention, the primary regulated pressure $P_1$ is typically about 10 psig to about 50 psig, and in one embodiment about 25 psig, above the usage pressure $P_3$, and the reserve regulated pressure $P_2$ is typically about 2 psig to about 20 psig, and in one embodiment about 5 psig, below the primary regulated pressure $P_1$, and typically about 10 psig to about 45 psig, and in one embodiment about 20 psig, above the usage pressure $P_3$.

FIG. 1 also shows, and characterizes a feature of the invention as, an HP gas supply system 5 that includes one or more primary cylinders 10, 10b containing HP gas, and one or more reserve cylinders 20, 20b containing HP gas.

Both the primary cylinder(s) 10 and the reserve cylinder(s) 20 have an outlet shutoff valve 11,21, respectively, typically integral with the gas outlet of the cylinders.

The HP gas supply system also includes a primary HP manifold 14 connected in fluid communication to the outlet shutoff valve 11 of each one or more primary cylinders 10, and to a low-pressure (LP) gas subsystem 6. The primary HP manifold 14 typically comprises lengths of high-pressure gas tubing or piping suitable for high pressure gases, and connectors, unions, and other fittings for connecting the primary HP manifold 14 in fluid communication with the outlet(s) of the primary cylinders 10, and to other valves, regulators, and instruments, including to a primary gas pressure ($P_P$) sensor 15. High-pressure gas tubing and fittings are typically made of a stainless steel, for example, 316 stainless steel, though other metal, alloys, and elastomeric materials and composites may be used. The primary HP manifold 14 can also include a flexible high-pressure hose 12 (commonly known as a pigtail) having a fitting or connector for threadedly- or snap-connecting to the outlet of a primary cylinder 10. It is noted that the function of detecting and displaying the primary gas pressure of the primary HP gas, as provided by primary sensor 15, can be integrated with the outlet of the primary cylinders 10.

The HP gas supply system further includes a reserve HP manifold 24 connected in fluid communication to the outlet shutoff valve 21 of each one or more reserve cylinders 20, and to the LP gas subsystem 6. The reserve HP manifold likewise typically comprises lengths of high-pressure gas tubing or piping suitable for high pressure gases, and connectors, unions, and other fittings for connecting the reserve HP manifold 24 in fluid communication with the outlet(s) of the reserve cylinders 20, and to other valves, regulators, and instruments, including to a reserve gas pressure (PR) sensor 25. The reserve HP manifold 24 can also include a flexible high-pressure hose 22 (or pigtail) having a fitting or connector for threadedly- or snap-connecting to the outlet of a reserve cylinder 20. It is noted that the function of detecting and displaying the reserve gas pressure of the reserve HP gas, as provided by reserve sensor 25, can be integrated with the outlet of the reserve cylinders 20.

The LP gas subsystem 6 includes a primary HP regulator 16 and a reserve HP regulator 26. The primary HP regulator 16 has a gas inlet in fluid (gas) communication with the primary HP manifold 14, and a gas outlet, and regulates the primary HP gas released from the one or more primary cylinders 10 to a primary regulated pressure $P_1$. The reserve HP regulator 26 has a gas inlet in fluid (gas) communication with the reserve HP manifold 24, and a gas outlet, and regulates the reserve HP gas released from the one or more reserve cylinders 20 to a reserve regulated pressure $P_2$. The outlets of the primary HP regulator 16 and the reserve HP regulator 26 are in fluid communication with a supply manifold 18, through an inlet 30 from the supply manifold 18 to a LP supply regulator 32. The LP supply regulator 32 is supplied at the inlet with the LP supply gas stream at either primary regulated gas pressure $P_1$ or reserve regulated gas pressure $P_2$, and regulates at the outlet 34 a usage gas stream at a usage pressure $P_3$, to the usage gas consumption system 40.

In practice, since the primary HP regulator 16 is configured to regulate the outlet gas the primary regulated pressure $P_1$, which is higher than the reserve regulated pressure $P_1$ of the reserve HP regulator 26, the flow of LP gas through the supply manifold 18 and inlet 30 to the LP supply regulator 32 will be from only the primary HP gas unit 3 and the primary cylinders 10. Only after the pressure $P_1$ of the gas from the primary pressure regulator 16 drops to below the regulated set point pressure $P_2$ of the reserve HP regulator 26 (at which point the gas pressure within the primary cylinder 10 and the primary HP manifold 14 have dropped to pressure $P_1$, will the flow of LP gas commence, and commence only, from the reserve HP gas unit 4 and the reserve cylinders 20, with flow will cease from the primary HP gas unit 3 and the primary cylinders 10.

Figure 3:
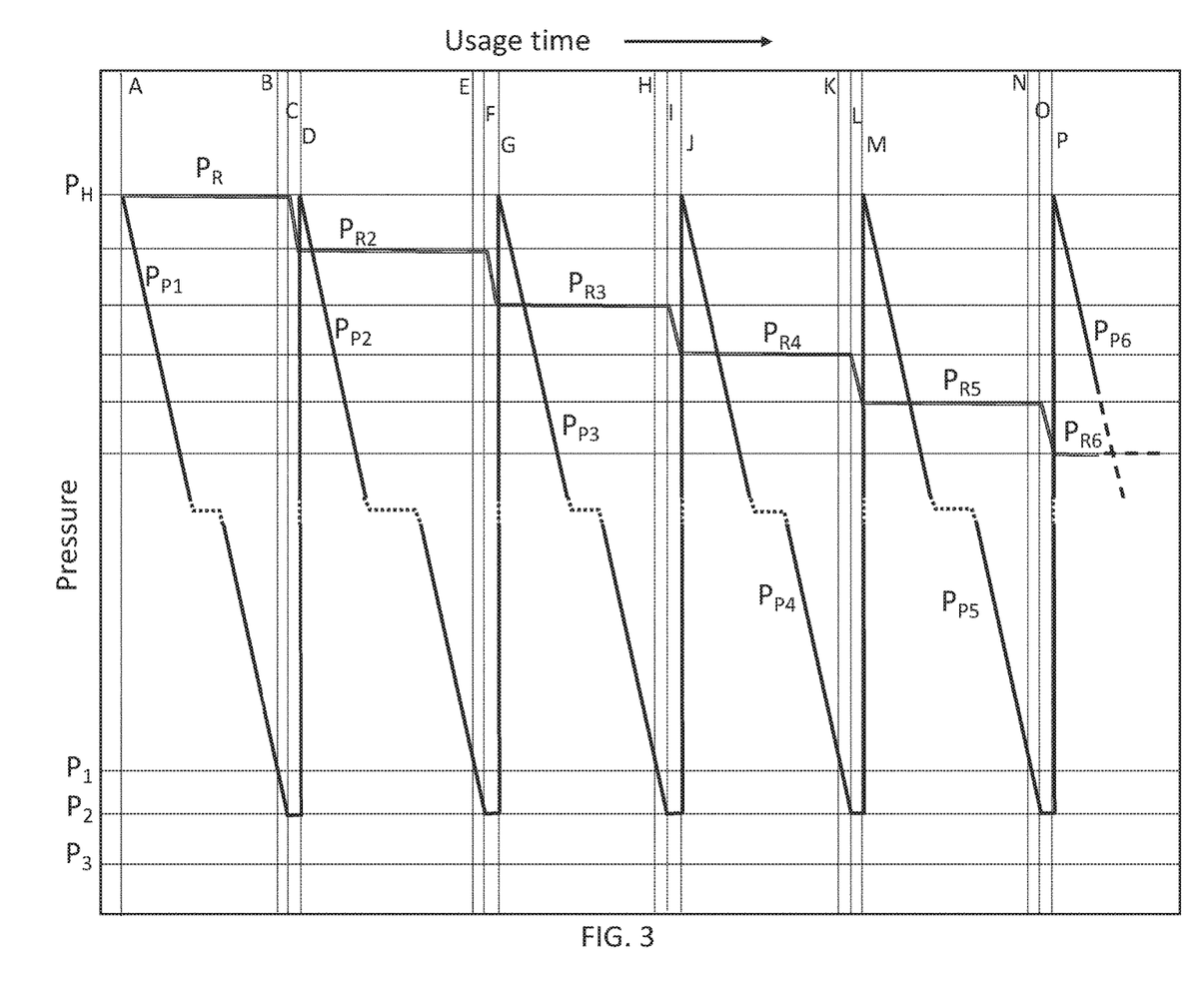
FIG. 3 shows the operation of the conventional gas supply system showing several cycles of the supply and depletion of HP gas from primary HP gas units, and the supply of HP gas from a reserve HP gas unit during short time periods while the depleted primary HP gas units are replaced and until they are replaced.
Figure 4:
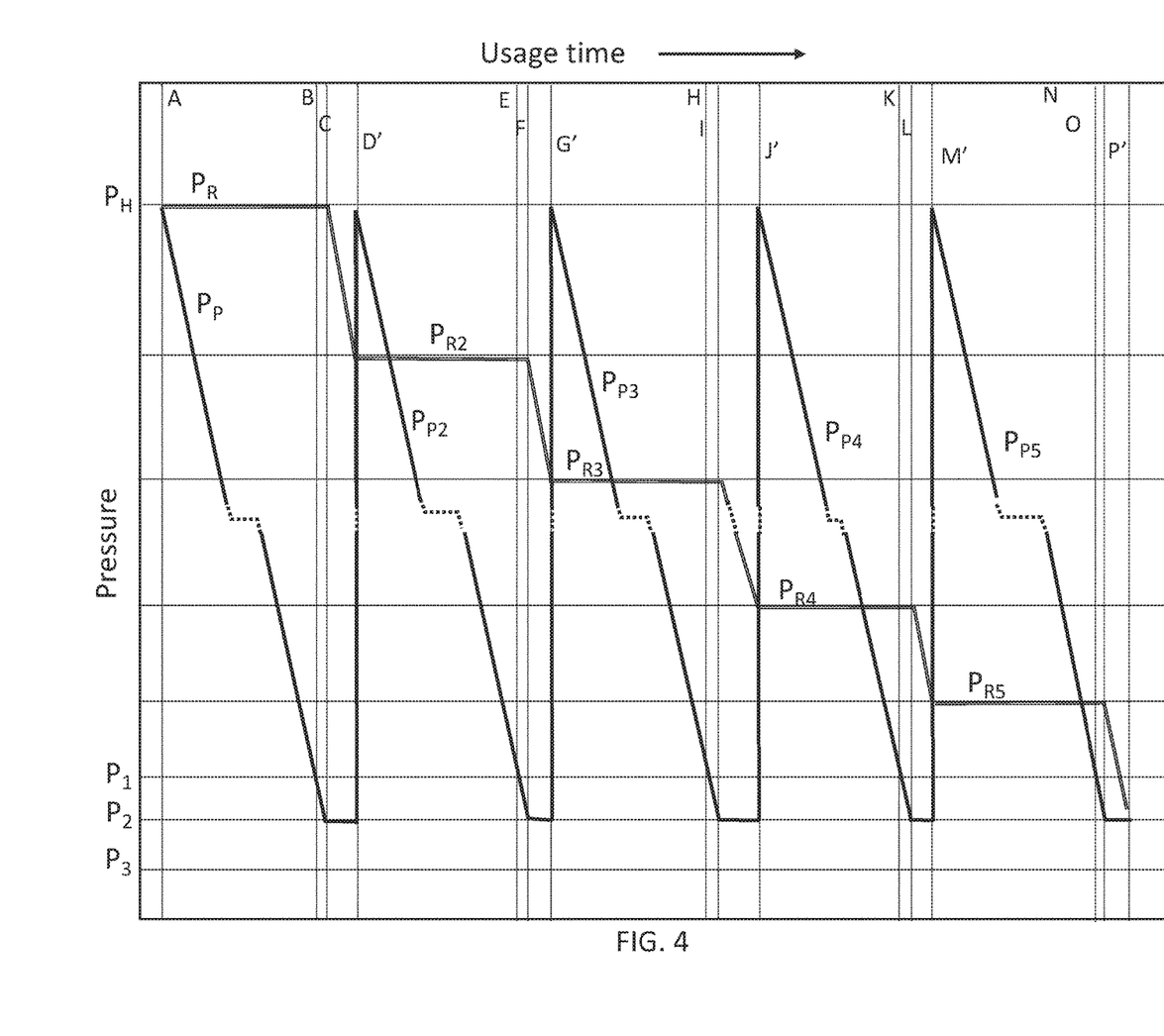
FIG. 4 shows a similar operation of the conventional gas supply system as shown in FIG. 3, where the time periods while the depleted primary HP gas units are replaced and until they are replaced, vary in duration as may occur in typical cycles of supply and depletion of HP gas, showing the near depletion of the reserve HP gas unit by the end of the last cycle.
Figure 5:
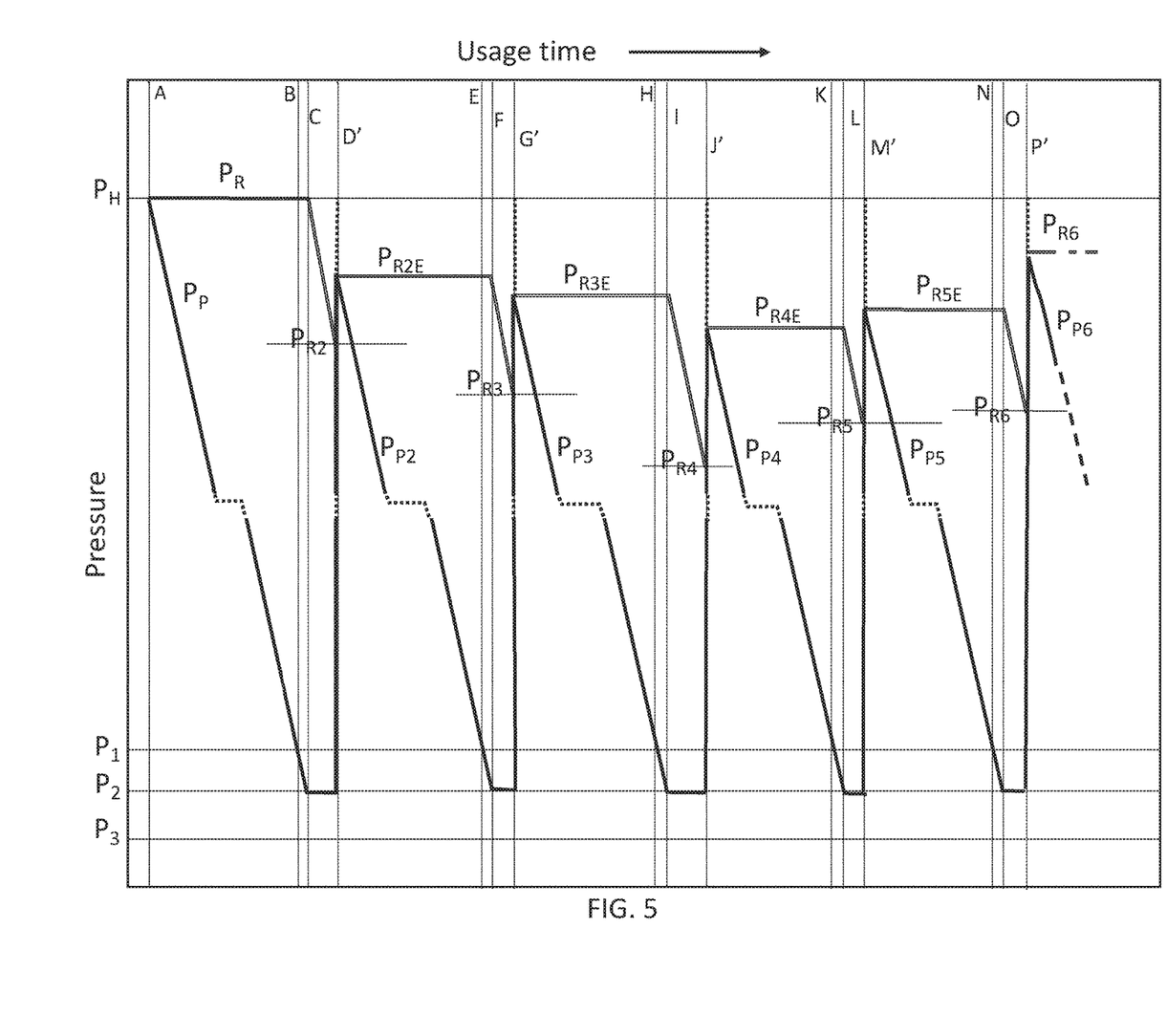
FIG. 5 shows an operation of the gas supply system of the present invention, under the same depletion and replacement time periods of the same duration as shown in FIG. 3, showing the reserve HP gas unit remains substantially full by the end of the last of the same cycles.

FIGS. 3-5 show charts of the gas pressures in high pressure and low-pressure supply systems, at a series of usage times of the system. Along the vertical pressure line, the top of the figure generally depicts high-pressure gas conditions, including an initial or full-tank gas pressure along an arbitrary horizontal line PH, which is the presumed pressure of all replacement primary cylinders. At the bottom are the lower and regulated pressures, including the low-pressure primary and reserve regulated pressures $P_1$ and $P_2$, and the usage pressure $P_3$. Usage time, which typically represents weeks, months and even years of time in typically systems, proceeds from left to right.

FIG. 3 illustrates the operation of the conventional gas supply system showing several cycles of the supply and depletion of HP gas from primary HP gas units, and the supply of HP gas from a reserve HP gas unit during short time periods while the depleted primary HP gas units are replaced and until they are replaced.

At time point A of FIG. 3, and of FIGS. 4 and 5 as well, both the primary gas pressure $P_P$ and the reserve gas pressure PR are at an initial "full pressure" condition, typically about 1000 psig. As described above, the usage gas consumption system utilizes a supplied gas regulated at usage pressure $P_3$. The LP gas subsystem 6 (FIG. 1) is in fluid communication with both the primary HP gas unit 3 and the reserve HP gas unit 4, and receives a LP supply gas stream from the supply manifold that is fed by both outputs of the primary HP regulator 16 and the reserve HP regulator 26. Between time A and B, the primary gas supply system 3 supplies all consumed gas, drawn as LP supply gas stream from the primary HP regulator 16, via the supply manifold 18 to LP supply regulator 32. In time, at time B, the consumption substantially depletes the gas supply in primary cylinder 10 to pressure $P_1$, and at time C completely depletes gas supply in primary cylinder 10 to pressure $P_2$. Starting at time C, the reserve gas supply system 4 and reserve cylinder 20 temporarily supplies all consumed gas, drawn as LP supply gas stream from the reserve HP regulator 26 to the supply manifold 18 and to LP supply regulator 32. The consumption is temporary until the depleted primary cylinder 10 is replaced, at time D, which typically requires a period of time for the depletion of the primary cylinder 10 is detected, for an order or instruction is placed to replace the depleted primary cylinder 10 with a full replacement primary cylinder 10, and for a technician or other trained person to deliver and install the replacement primary cylinder 10. Installation requires that the depleted primary cylinder(s) be disconnected from the primary HP manifold 14, typically by detachment of the end of the pigtail 12 from the cylinder outlet, and removed from its secured position at the facility, and that the replacement primary cylinder is positioned and secured in place, connected to the primary HP manifold 14 by re-attachment of the pigtail 12, and opening of the shutoff valve 11. During the period from time C to time D, the supply of HP gas and thus the pressure within the reserve cylinder 20 has dropped from initial pressure $P_{R1}$ at time C, to pressure $P_{R2}$ at time D. The period between time C and time D is for illustration purposes, but assumes that the reserve cylinder is used some periods of time that result in a substantial reduction in the gas pressure within the reserve cylinder 20, to pressure $P_{R2}$ at time D. Likewise, the rate of pressure loss with time is numberless, and is for illustration purposes only.

A similar second cycle commences as time D, and proceeds through time E, F and G in the same manner. The period from time F to time G during which the primary cylinder 10 is depleted and the supply of HP gas is from the reserve cylinder 20, and the next replacement primary cylinder 10 is on-line, results in the pressure within the reserve cylinder 20 dropping from first cycle ending pressure $P_{R2}$, to pressure $P_{R3}$ at time G. Three additional cycles of usage are shown, illustrating that the gas pressure in the reserve cylinder 20 has dropped to pressure $P_{R4}$ at time J, to $P_{R5}$ at time M, and $P_{R6}$ at time P. In the operation illustrated in FIG. 3, despite five cycles of depletion of the primary cylinder, the supply pressure within the reserve cylinder 20, though significantly reduced, remains capable of providing reserves for numerous more cycles.

FIG. 4 shows a similar operation of the conventional gas supply system as shown in FIG. 3, though illustrating the operation conditions which may be more realistic, where the time period between the depletion of the primary cylinder and its replacement and reconnection to the system, experiences delays for various reasons, such as scheduling, other priorities or other delays in scheduling, etc. When such time periods of operation while the primary cylinder is depleted, the supply of gas and pressure within the reserve cylinder can be reduced significantly. FIG. 4 shows in an illustration of the delays that can occur in replacing the primarily cylinder, a number of extended periods of time during which the pressure in the reserve cylinder 20 is reduced significantly, especially for example, during the time periods between time C and time D', and time I and J'. As illustrated, these extended periods of time when the operation proceeds with a depleted primary cylinder and running off the reserve cylinder, the operation is at risk of having the reserve cylinder being itself depleted.

FIG. 5 shows an operation of the gas supply system of the present invention, under the periods of time illustrated in FIG. 3 of running off the reserve cylinder after the primary cylinder is depleted. However, as a result of the invention, the gas supply and pressure in the reserve cylinder remains high, and substantially full, even by the end of the last of the same cycles.

In the present invention, when the technician replaces the depleted primary cylinder 10 with a replacement primary cylinder, the one-direction (one-way) flow valve permits the flow of high-pressure gas from the replacement primary cylinder 10 through the primary HP manifold 14, to the reserve cylinder 20 via the reserve HP manifold 24. The reserve cylinder 20 has a reserve gas pressure significantly lower than the primary gas pressure of the replacement primary cylinder, which allows the flow of cylinder gas from the primary cylinder 10 to the reserve cylinder 20 to continue until the pressures in the primary cylinder 10 and the reserve cylinder 20 equilibrate at a pressure $P_{RE}$. Assuming the volume of the primary cylinders and the reserve cylinders are substantially the same volume, the equilibrium pressure $P_{RE}$, is about halfway between the reserve gas pressure $P_P$, and the initial or full primary gas pressure of the replacement primary cylinder 10.

FIG. 5 shows an operation similar to the more realistic operation of the conventional gas supply system shown in FIG. 3, illustrating the operation of the high pressure gas supply system of the present invention that employs the one-direction flow valve in fluid communication between and from the primary HP manifold, to the reserve HP manifold. Under the same operation timing as in FIG. 4 for the replacement of depleted primary cylinders with replacement primary cylinders, use of the present invention maintains a significantly increased supply and gas pressure within the reserve cylinder, compared to the conventional gas supply system as illustrated in FIGS. 1 and 4.

FIG. 4 shows that despite the several extended periods of time during which the reserve cylinder 20 supplies the HP gas and the primary cylinder 10 is depleted, especially for example, during the time periods between time C and time D', and time I and J', the supply and gas pressure within the reserve cylinder 20 remains elevated, and remote from being depleted as was the case in FIG. 4 with the conventional gas supply system. To illustrate the operation using the present invention, when the technician replaces the depleted primary tank 10 at time D', the reserve cylinder 20 has a reserve gas pressure PR. Upon installing and connecting the replacement primary tank in fluid communication to the primary HP manifold 14, the one-direction flow valve 50 passes HP gas at the higher primary HP gas pressure to the reserve cylinder, until the reserve HP pressure in the reserve cylinder 20 equilibrates with the primary HP pressure in the primary cylinder 10 at HP pressure $P_{R2E}$, which is about halfway between the pressure PR and the initial pressure $P_P$ of the replacement primary cylinder. The effect is to raise the reserve HP gas pressure each time a fresh primary cylinder is installed. In the illustrated operation, despite the extension delays in replacing the depleted primary cylinder with a fresh primary cylinder 10, the reserve gas pressure $P_{RE}$ remains elevated. As can be seen, in cycles where are the deleted primary tank is replaced promptly by the technician with a replacement primary tank, the HP gas pressure and supply in the reserve cylinder 20 in fact increases. Use of the present invention, even when a technician may at times take more than the usual amount of time to replace a depleted primary cylinder, ensures that the reserve HP gas pressure in the reserve cylinder remains high, avoiding the need to replace the reserve cylinder, and avoiding the risk that the reserve tank pressure and supply might mistakenly, unexpectedly or unintentionally be depleted.

We claim:

1. A system for providing high pressure (HP) gas to a low pressure (LP) gas destination, comprising:
   (i) a primary HP gas unit comprising:
      a. one or more primary cylinders containing HP gas, each primary cylinder including an outlet shutoff valve,
      b. a primary HP regulator having a gas inlet and a regulated gas outlet, the primary HP regulator configured to regulate the primary HP gas released from the one or more primary cylinders to a primary low pressure (LP) supply gas at a primary regulated pressure $P_1$, and
      c. a primary HP manifold connected in fluid communication between the outlet of the shutoff valve of each one or more primary cylinders, and the gas inlet of the primary HP regulator;
   (ii) a reserve HP gas unit comprising:
      a. one or more reserve cylinders containing HP gas, each reserve cylinder including an outlet shutoff valve,
      b. a reserve HP regulator having a gas inlet and a regulated gas outlet, the reserve HP regulator configured to regulate the reserve HP gas released from the one or more reserve cylinders to a reserve LP supply gas at a reserve regulated pressure $P_2$ that is less than the primary regulated pressure $P_1$, and
      c. a reserve HP manifold connected in fluid communication between the outlet of the shutoff valve of each one or more reserve cylinders, and the gas inlet of the reserve HP regulator;
   (iii) a supply manifold connected in fluid communication to the regulated gas outlet of the primary HP regulator, and the regulated gas outlet of the reserve HP regulator;
   (iv) an LP supply regulator having a gas inlet in fluid communication with the supply manifold, and a regulated gas outlet in fluid communication with a usage gas consumption system, the LP supply regulator configured to regulate the primary LP supply gas or the reserve LP supply gas to a usage pressure $P_3$ that is less than primary regulated pressure $P_1$ and reserve regulated pressure $P_2$; and
   (v) a one-way flow valve having an inlet in fluid communication with the primary HP manifold, and an outlet in fluid communication with the reserve HP manifold.

2. The HP gas supply system according to claim 1 wherein the one-way flow valve is a check valve.

3. A HP gas supply system, comprising:
   (i) one or more primary cylinders containing HP gas, each primary cylinder including an outlet shutoff valve, (ii) a primary HP manifold connected in fluid communication to the outlet shutoff valve of each one or more primary cylinders, and to a separate, low-pressure gas subsystem, (iii) one or more reserve cylinders containing HP gas, each reserve cylinder including an outlet shutoff valve, (iv) a reserve HP manifold connected in fluid communication to the outlet shutoff valve of each one or more reserve cylinders, and to the low-pressure gas subsystem, and (v) a one-way flow valve having an inlet in fluid communication with the primary HP manifold, and an outlet in fluid communication with the reserve HP manifold.

4. The HP gas supply system according to claim 3 wherein the one-way flow valve is a check valve.

5. The HP gas supply system according to claim 3 wherein the low-pressure gas subsystem comprises:

(i) a primary HP regulator having a gas inlet in fluid communication with the primary HP manifold, and a regulated gas outlet, the primary HP regulator configured to regulate the primary outlet gas released from the one or more primary cylinders to a regulated pressure $P_1$, (ii) a reserve HP regulator having a gas inlet in fluid communication with the reserve HP manifold, and a regulated gas outlet, the reserve HP regulator configured to regulate the reserve outlet gas released from the one or more reserve cylinders to a regulated pressure $P_2$ that is less than regulated pressure $P_1$, (iii) a supply manifold connected in fluid communication to the regulated gas outlet of the primary HP regulator, and to the regulated gas outlet of the reserve HP regulator; and (iv) an LP usage regulator having a gas inlet in fluid communication with the supply manifold, and a regulated gas outlet in fluid communication with a separate usage gas consumption system, the LP usage regulator configured to regulate the primary outlet gas or the reserve outlet gas to a usage pressure $P_3$ that is less than the primary regulated pressure $P_1$ and the reserve regulated pressure $P_2$.

6. The HP gas supply system according to claim 3, further including:

(vi) a primary HP regulator having a gas inlet connected to the primary HP manifold, and a regulated gas outlet, (vii) a reserve HP regulator having a gas inlet connected to the reserve HP manifold, and a regulated gas outlet, and (viii) a supply manifold connected in fluid communication to the regulated gas outlet of the primary HP regulator, to the regulated gas outlet of the reserve HP regulator, and to the separate, low-pressure gas subsystem.

7. The HP gas supply system according to claim 6, wherein the primary HP regulator is configured to regulate the primary HP gas released from the one or more primary cylinders to a primary low pressure (LP) supply gas at a primary regulated pressure $P_1$, and the reserve HP regulator is configured to regulate the reserve HP gas released from the one or more reserve cylinders to a reserve LP supply gas at a reserve regulated pressure $P_2$ that is less than the primary regulated pressure $P_1$.

* * * * *